United States Patent
Inada et al.

(10) Patent No.: US 11,400,406 B2
(45) Date of Patent: Aug. 2, 2022

(54) WET ABATEMENT SYSTEM

(71) Applicant: EBARA CORPORATION, Tokyo (JP)

(72) Inventors: Takanori Inada, Tokyo (JP);
Kazumasa Hosotani, Tokyo (JP);
Kazutomo Miyazaki, Tokyo (JP);
Kohei Matsumoto, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 835 days.

(21) Appl. No.: 16/280,538

(22) Filed: Feb. 20, 2019

(65) Prior Publication Data

US 2019/0262760 A1     Aug. 29, 2019

(30) Foreign Application Priority Data

Feb. 26, 2018   (JP) .............................. JP2018-031823

(51) Int. Cl.
*B01D 47/02*     (2006.01)
*F23J 15/02*     (2006.01)
(Continued)

(52) U.S. Cl.
CPC ........... *B01D 47/027* (2013.01); *B01D 53/18* (2013.01); *B01D 53/46* (2013.01); *B01D 53/58* (2013.01); *B01D 53/68* (2013.01); *B01D 53/78* (2013.01); *F23G 7/06* (2013.01); *F23J 15/02* (2013.01); *F23J 15/025* (2013.01);
(Continued)

(58) Field of Classification Search
None
See application file for complete search history.

(56) References Cited

U.S. PATENT DOCUMENTS 3,748,835 A * 7/1973 Panzica .............. B01D 21/0012
96/265
6,638,343 B1 * 10/2003 Kawamura ............ F23J 15/006
95/218
(Continued)

FOREIGN PATENT DOCUMENTS

EP         1 933 088 A2    6/2008
JP         S54-160564 A    12/1979
(Continued)

OTHER PUBLICATIONS

Extended European Search Report issued in Patent Application No. EP 19 15 9187.4 dated Aug. 2, 2019.

*Primary Examiner* — Christopher P Jones
*Assistant Examiner* — Phillip Y Shao
(74) *Attorney, Agent, or Firm* — Pearne & Gordon LLP

(57) ABSTRACT

A wet abatement system which can suppress the accumulation of foreign matters in a treatment gas line is proposed. There is provided a wet abatement system for detoxifying treatment gas by bringing the treatment gas into contact with liquid. The wet abatement system includes an inlet casing having an inlet port from which the treatment gas is let in and an outlet port provided below the inlet port and through which the treatment gas flows, and a liquid film forming device provided between the inlet port and the outlet port and configured to form a liquid film on an inner wall surface of the inlet casing. A heater configured to heat the inlet casing is embedded in an interior of a wall portion of the inlet casing, the wall portion constituting a portion situated above the liquid film forming device.

12 Claims, 11 Drawing Sheets

(51) Int. Cl.
*F23G 7/06* (2006.01)
*B01D 53/46* (2006.01)
*B01D 53/78* (2006.01)
*B01D 53/18* (2006.01)
*B01D 53/68* (2006.01)
*B01D 53/58* (2006.01)

(52) U.S. Cl.
CPC .. *B01D 2257/204* (2013.01); *B01D 2257/406* (2013.01); *B01D 2257/553* (2013.01); *F23G 2209/142* (2013.01); *F23J 2217/50* (2013.01); *F23J 2219/40* (2013.01)

(56) References Cited

U.S. PATENT DOCUMENTS

| | | | | |
|---|---|---|---|---|
| 2003/0164560 A1* | 9/2003 | Okuda | ............... | F23J 15/022 261/90 |
| 2005/0064353 A1* | 3/2005 | Wiesenberg | ............ | F23G 7/065 431/353 |
| 2008/0131334 A1* | 6/2008 | Kawamura | ............... | F23G 5/24 422/169 |
| 2010/0116140 A1* | 5/2010 | Arai | ................... | B01D 53/8662 96/252 |
| 2014/0366958 A1* | 12/2014 | Miyazaki | ................ | F23J 15/04 137/240 |
| 2015/0000870 A1* | 1/2015 | Hosotani | ............... | F28D 1/0213 165/104.19 |
| 2015/0367284 A1* | 12/2015 | Shinohara | ............. | B01D 53/72 422/171 |
| 2017/0072437 A1* | 3/2017 | Sakurai | ................ | B01D 47/027 |

FOREIGN PATENT DOCUMENTS

| | | |
|---|---|---|
| JP | 2003-251130 A | 9/2003 |
| WO | 2012-153523 A1 | 11/2012 |
| WO | 2018-034331 A1 | 2/2018 |

\* cited by examiner

WET ABATEMENT SYSTEM

TECHNICAL FIELD

The present invention relates to a wet abatement system and more particularly to a wet abatement system for detoxifying treatment gas by bringing the treatment gas into contact with liquid.

BACKGROUND ART

A vacuum pump system is widely used as a piece of equipment for producing semiconductors, liquid crystals, solar panels, LEDs, or the like. In a fabrication process of such products, a vacuum pump is connected to a vacuum chamber, and treatment gas introduced into the vacuum chamber is drawn out under vacuum by the vacuum pump. The gas drawn out under vacuum by the vacuum pump may contain toxic combustible gas such as silane gas ($SiH_4$), dichlorosilane gas ($SiH_2Cl_2$), or ammonium gas ($NH_3$), or halogen-based non-decomposable gas such as $NF_3$, $ClF_3$, $SF_6$, $CHF_3$, $C_2F_6$, or $CF_4$, which cannot be released into the atmosphere as it is. To cope with this, in the vacuum pump system, conventionally, an abasement system for detoxifying toxic gas drawn out under vacuum is provided at a stage posterior to the vacuum pump. As a detoxifying treatment of toxic gas, there are known a wet detoxifying treatment in which treatment gas is brought into contact with liquid to remove foreign matters and water-soluble constituents and a combustion detoxifying treatment in which treatment gas is burnt.

Treatment gas discharged from the vacuum pump may contain a substance solidified or a substance easy to be solidified by a reaction inside the vacuum chamber as a reaction side product. When such a reaction side product enters the abasement system, there are fears that a clogging of piping or the abasement system or a reduction in treatment efficiency of the abasement system is caused. To cope with this, there is a case a foreign matter removing mechanism for removing foreign matters is provided between the vacuum pump system and the abasement system.

For example, a filter or a trap can be used as such a foreign matter removing mechanism. Although the filter or the trap can remove foreign matters by its simple configuration, periodical maintenance such as a replacement of filters is necessary. Additionally, as a foreign matter removing mechanism, there is also known a fan scrubber, which includes a fan for stirring gas, a motor for driving the fan, and a nozzle for jetting liquid. In the fan scrubber, foreign matters are captured by the liquid jetted from the nozzle. The fan scrubber functions not only as the foreign matter removing mechanism but also as a wet abasement system.

CITATION LIST

Patent Literature

PTL 1: Japanese Patent Laid-Open No. 2003-251130

SUMMARY OF INVENTION

Technical Problem

In the conventional foreign matter removing mechanism or abasement system, there may be situations where foreign matters such as a condensable product accumulate in piping situated upstream of a section where the removal or abatement function is exhibited. To prevent the accumulation of foreign matters in the piping, the piping is heated, a wet wall (a liquid surface) is formed on the piping, or a scraper is used to mechanically scrape the accumulated foreign matters. Here, when the piping is heated, it is desirable that the piping is heated to a high temperature of 150° C. or higher, for example. In the wet abatement system, however, the temperature of the piping is decreased by the liquid in the vicinity of the area where the liquid is supplied, whereby foreign matters accumulate near the area from time to time. Additionally, in the case of the wet wall being formed, too, foreign matters such as a condensable product accumulate on an upstream side of the wet wall, or a reaction product of water-soluble gas such as dichlorosilane gas ($SiH_2Cl_2$) with water accumulates at the liquid supply portion for forming the wet wall. Some reaction products produced from the reaction of such a water-soluble gas with water produce an unstable reaction product where the reaction has not yet been completed, for example, a highly reactive siloxane mixture that produces hydrogen from time to time. When foreign matters are removed by the scraper near the area where the liquid is supplied, there occurs a known risk of hydrogen being ignited by static electricity generated by friction.

The present invention has been made in view of these problems, and an object of the present invention is to provide a wet abatement system which can suppress the accumulation of foreign matters in a treatment gas line.

Solution to Problem

According an embodiment of the present invention, there is proposed a wet abatement system for detoxifying treatment gas by bringing the treatment gas into contact with liquid. This wet abatement system includes an inlet casing having an inlet port from which the treatment gas is let in and an outlet port provided below the inlet port and through which the treatment gas flows, a liquid film forming device provided between the inlet port and the outlet port and configured to form a liquid film on an inner wall surface of the inlet casing, and a heater configured to heat the inlet casing and embedded in an interior of a wall portion of the inlet casing, the wall portion constituting a portion situated above the liquid film forming device.

According to the wet abatement system described above, the liquid film is formed on the inner wall surface of the inlet casing, and the heater is embedded in the interior of the wall portion of the inlet casing which is situated above the liquid film. This allows the inlet casing to be heated to the vicinity of the inner wall surface where the liquid film is formed, thereby making it possible to prevent the accumulation of foreign matters in the treatment gas line.

DESCRIPTION OF EMBODIMENT

Figure 1:
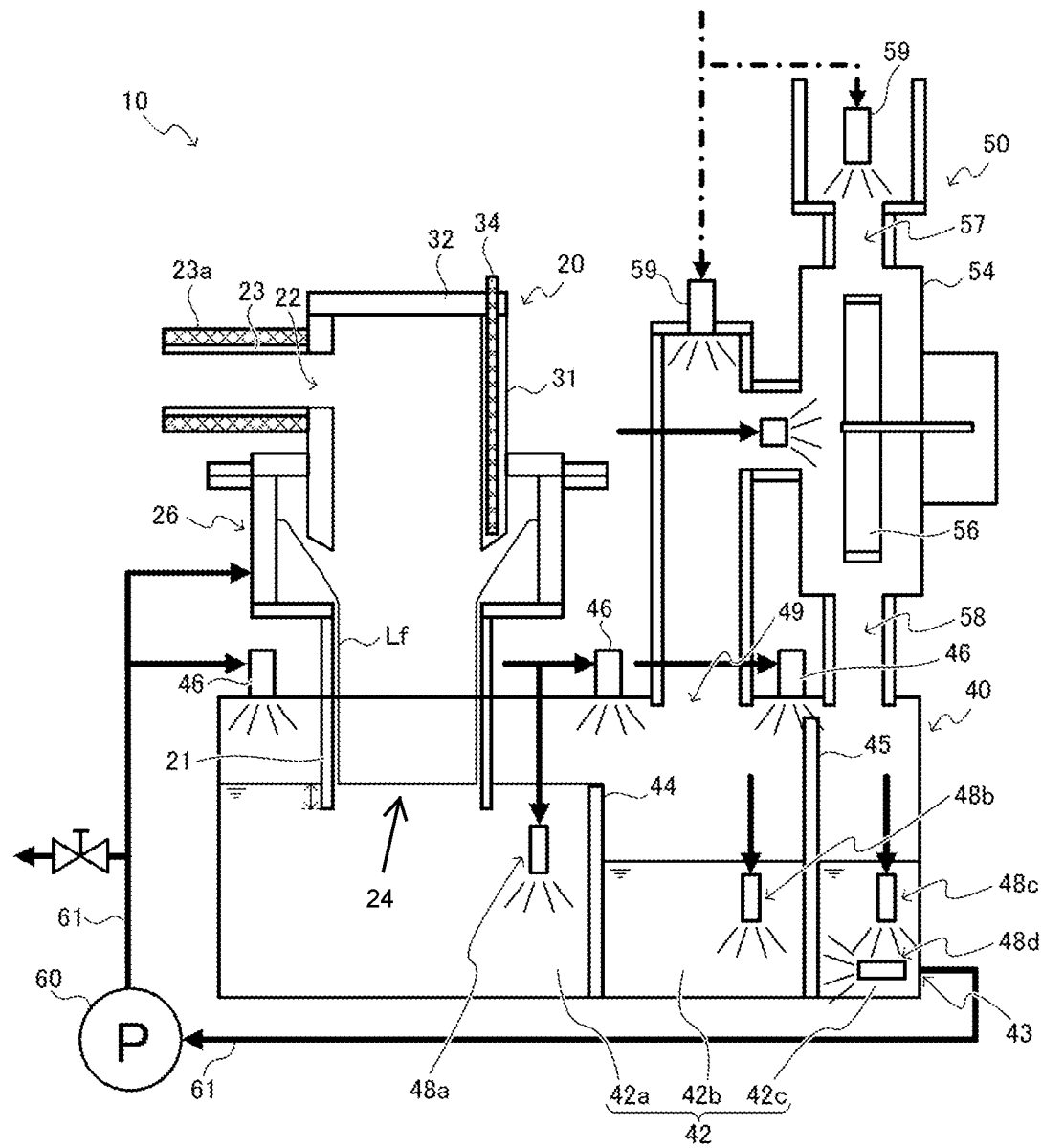
FIG. 1 is a drawing illustrating a schematic configuration of a wet abatement system according to an embodiment.

Hereinafter, referring to drawings, an embodiment of the present invention will be described. In the following description, in the drawings, like reference signs will be given to like or corresponding configuration elements, so that similar descriptions are not made repeatedly. A wet abatement system of the embodiment detoxifies treatment gas by bringing the treatment gas into contact with liquid and can be made use of as a piece of equipment for producing, for example, semiconductors, liquid crystals, solar panels or LEDs.

FIG. 1 is a drawing illustrating a schematic configuration of a wet abatement system according to an embodiment of the present invention. This wet abatement system 10 is provided to detoxify gas from a vacuum pump, and a vacuum pump, not shown, is connected to a primary side (upstream side) of the wet abatement system. The wet abatement system of the embodiment may be provided singly or may be used together with another combustion abatement system to detoxify gas from the vacuum pump. For example, in the case where all removal target gas that is contained in gas drawn out under vacuum by the vacuum pump is made up of water-soluble constituents, the wet abatement system 10 may be used singly. When the wet abatement system 10 is used together with another abatement system, the other abatement system is preferably connected to a posterior stage to the wet abatement system 10.

As illustrated in FIG. 1, the wet abatement system 10 of the embodiment includes an inlet casing 20 into which treatment gas from the vacuum pump, not shown, is let, a liquid tank casing 40 connected to the inlet casing 20, and a treatment casing 50 connected to the liquid tank casing 40. Treatment gas let into the inlet casing 20 flows through the liquid tank casing 40 and the treatment casing 50 and is then discharged to an exterior of the system or is continuously introduced into another abatement system.

The inlet casing 20 of this embodiment has a circular cylindrical shape as a whole, which is closed at an upper end while being opened at a lower end. The opening at the lower end of the inlet casing 20 constitutes an outlet port 24, through which treatment gas flows, and is disposed inside the liquid tank casing 40. An inlet port 22, which is connected to the vacuum pump, not shown, is formed in the vicinity of the upper end of the inlet casing 20. Treatment gas let into the inlet casing 20 from the inlet port 22 flows through the outlet port 24 to be guided into the liquid tank casing 40. A piping heater 23a is provided on an inlet piping 23 extending from the inlet port 22 towards the vacuum pump. The piping heater 23a heats the inlet piping 23 to a predetermined temperature (for example, 180° C.) when treatment gas flows through the inlet piping 23, and various types of heaters including a jacket heater can be adopted for the piping heater 23a. Foreign matters are restrained from accumulating in the inlet piping 23 and the inlet port 22 by the piping heater 23a configured in that way.

A liquid film forming device 26, configured to form a liquid film (a wet wall, water fall) Lf on an inner wall surface of the inlet casing 20, is provided between the inlet port 22 and the outlet port 24 of the inlet casing 20. In this embodiment, the liquid film forming device 26 is provided to extend circumferentially along a full circumference of the inlet casing 20 having an annular shape. That is, the inlet casing 20 is divided into a wall portion 31 defined above the liquid film forming device 26 and a wall portion 21 defined below the liquid film forming device 26. By forming a liquid film Lf on the inner wall surface using the liquid film forming device 26, foreign matters are caused to flow down near the inner wall surface of the wall portion 21 by the liquid film so formed, whereby foreign matters are restrained from accumulating on the wall portion 21.

FIGS. 2 to 9 illustrate configuration examples of various types of mechanisms for forming a liquid film on the inner wall surface of the wall portion 21.

Figure 2:
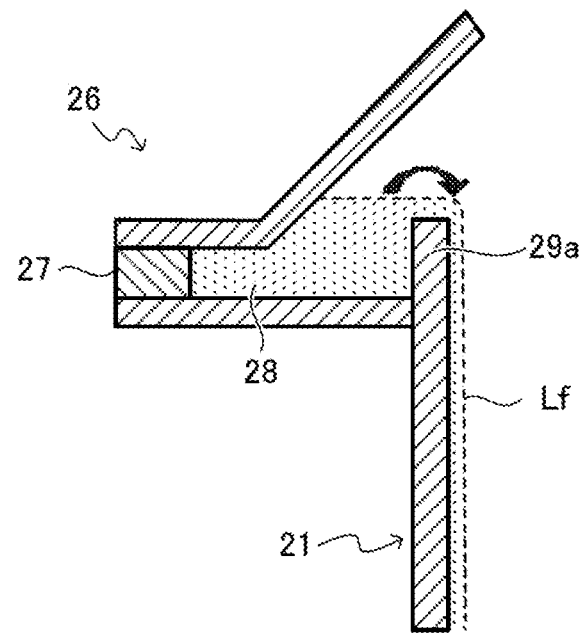
FIG. 2 is an enlarged side view of a liquid film forming device illustrating a configuration thereof as viewed from a side thereof.

FIG. 2 is an enlarged side view of a liquid film forming device 26 illustrating a configuration as viewed from a side thereof. The liquid film forming device 26 of this example includes an annular liquid reservoir 28 situated adjacent to the inner wall surface of the wall portion 21, a weir 29a which continues to the wall portion 21 while projecting upwards above the liquid reservoir 28, and a liquid supply portion 27 configured to supply liquid to the liquid reservoir 28. By leveling a top portion of the weir 29a at a uniform height, liquid overflowing from the liquid reservoir 28 flows down along the inner wall surface of the wall portion 21 to thereby form a liquid film of a uniform thickness. In the example illustrated in FIG. 2, the top portion of the weir 29a has a rectangular shape; however, the top portion of the weir 29a may be rounded into a curved surface. By doing so, liquid is allowed to flow over the weir 29a more smoothly.

Figure 3:
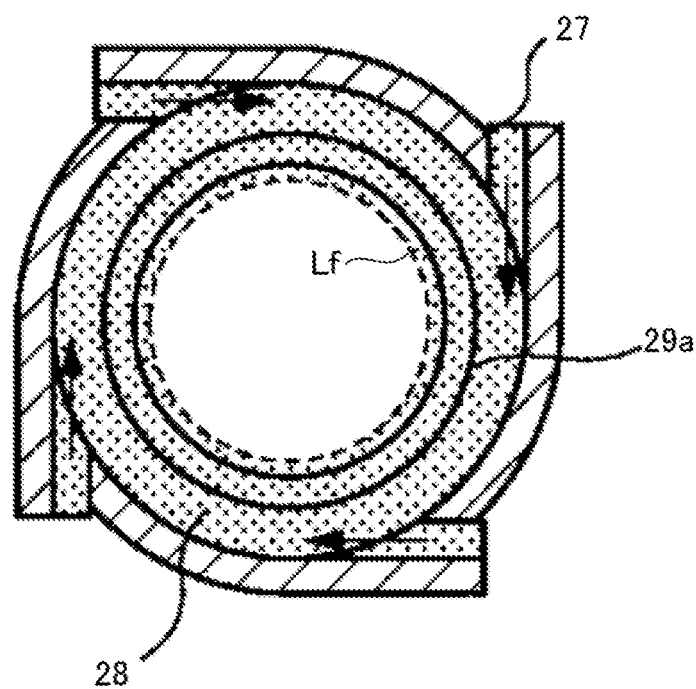
FIG. 3 is a top view of the liquid film forming device illustrating the configuration as viewed from a top thereof.

FIG. 3 is a top view of the liquid film forming device 26 illustrating the configuration as viewed from a top thereof. As illustrated in FIG. 3, liquid is preferably supplied into the liquid reservoir 28 from a tangent direction to the liquid reservoir 28. This forms a swirling flow in the liquid reservoir 28, whereby liquid flowing over the weir 29a is allowed to flow spirally. By generating a swirling flow in the liquid reservoir 28, the level of liquid in the liquid reservoir 28 can be raised uniformly around a full circumference thereof to thereby allow liquid to flow over the weir 29a, whereby a uniform liquid film can be formed on the inner wall surface of the wall portion 21. In the example illustrated in FIG. 3, although four liquid supply portions 27 are provided, the configuration is not limited thereto, and hence, one or more liquid supply portions 27 should be provided.

Figure 4:
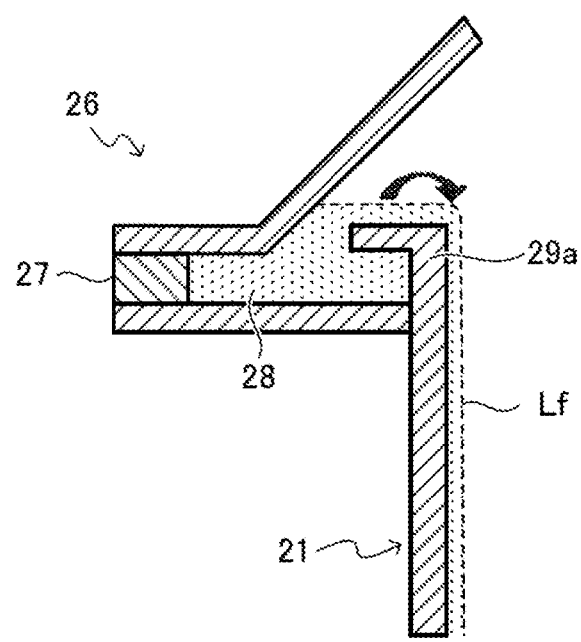
FIG. 4 is a drawing illustrating a modified example made to the liquid film forming device illustrated in FIG. 2.

FIG. 4 illustrates a modified example made to the liquid film forming device 26 illustrated in FIG. 2. A top portion of a weir 29b has an L-shape in which an outer circumferential side of the top portion projects radially outwards. In this example, too, it is considered that a uniform liquid film can be formed on an inner wall surface of a wall portion 21. In this case, too, the top portion of the weir 29b may be rounded into a curved surface.

Figure 5:
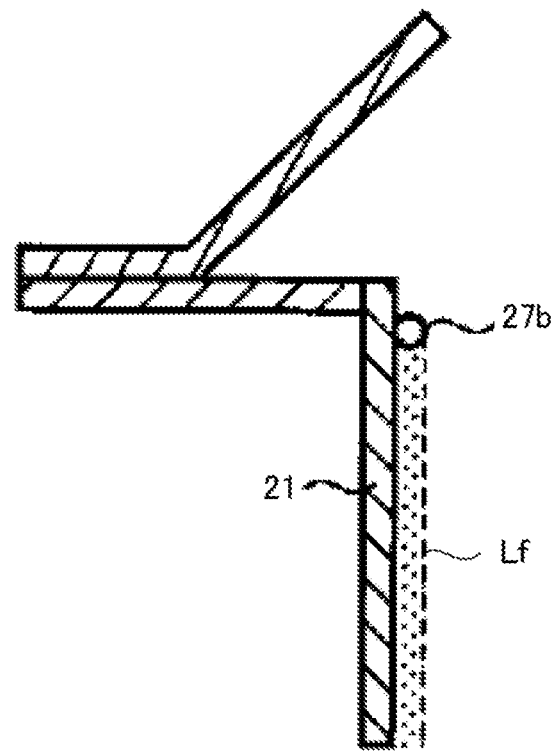
FIG. 5 is a side view of an example of a liquid film forming device having no liquid reservoir as viewed from a side thereof.
Figure 6:
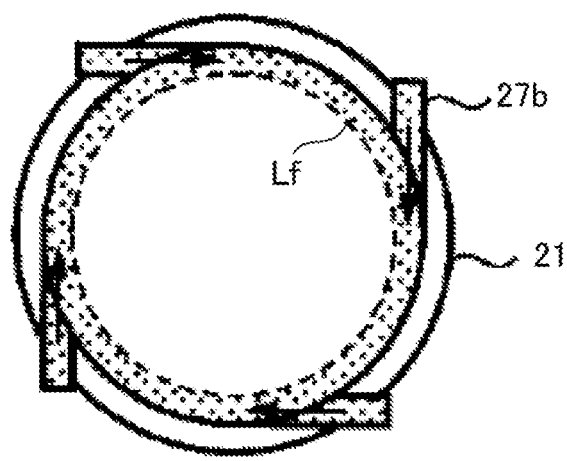
FIG. 6 is a top view of the example of the liquid film forming device having no liquid reservoir as viewed from a top thereof.

In the examples illustrated in FIGS. 2 to 4, although the liquid film forming device 26 is described as having the liquid reservoir 28, the liquid film forming device 26 may not have the liquid reservoir 28. FIGS. 5 and 6 illustrate an example of a liquid film forming device 26 having no liquid reservoir. In the example illustrated in FIGS. 5 and 6, a liquid supply portion 27b preferably supplies liquid directly on to an inner wall surface of a wall portion 21. Here, as illustrated in FIG. 6, the liquid supply portion 27b supplies liquid in a tangent direction to the inner wall surface of the wall portion 21 so that the liquid spirally flows down along the inner wall surface. In this example, too, it is considered that a uniform liquid film can be formed on the inner wall surface of the wall portion 21. In the example illustrated in FIG. 6, although four liquid supply portions 27b are provided, the configuration is not limited thereto, and hence, one or more liquid supply portions 27b should be provided.

Figure 7:
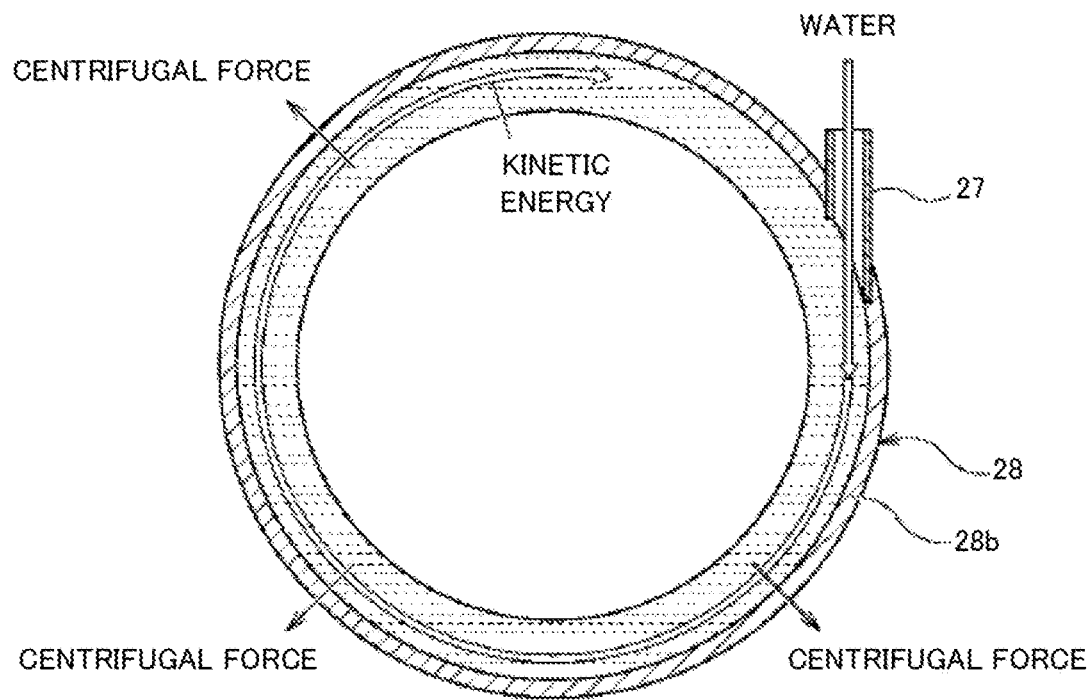
FIG. 7 is a top view of an example of a liquid film forming device including a liquid reservoir having no weir as viewed from a top thereof.
Figure 8:
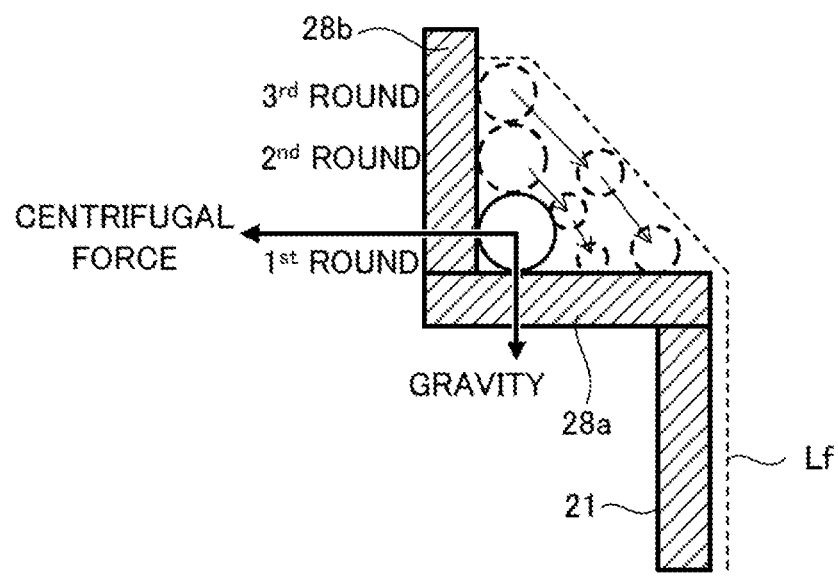
FIG. 8 is an enlarged side view of the example of the liquid film forming device including the liquid reservoir having no weir as viewed from a side thereof.

In addition, the weirs 29a, 29b may not be provided in the liquid reservoir 28 of the liquid film forming device 26. FIGS. 7 and 8 illustrate an example of a liquid film forming device including a liquid reservoir having no weir. As illustrated in FIG. 7, liquid is supplied from a liquid supply portion 27c placed along a tangent direction to an inner surface of a side wall 28b of a liquid reservoir 28. Liquid supplied from the liquid supply portion 27c flows along the side wall 28b of the liquid reservoir 28 by virtue of the kinetic energy thereof. As this occurs, a centrifugal force is exerted on the liquid, and the liquid attempts to continue to flow circumferentially along a side surface of the side wall 28b as illustrated in FIG. 8. On the other hand, since liquid continues to be supplied from the liquid supply portion 27c, in the liquid flowing circumferentially on the side wall 28b, a circumferential flow of liquid that has flowed a full circumference of the side wall 28b three times is raised upwards by a circumferential flow of liquid that has flowed a full circumference of the side wall 28b twice, which is raised upwards by a circumferential flow of liquid that has flowed a full circumference of the side wall 28b once. In this way, a circumferential flow of liquid that continues to flow circumferentially more times is raised upwards by a circumferential flow of liquid that continues to flow circumferentially fewer times. However, as the number of times the liquid flows a full circumference of the side wall 28b increases, the kinetic energy of the liquid is reduced due to friction, and at the same time, the centrifugal force exerted on the liquid is weakened, whereby the liquid raised upwards flows downwards circumferentially inwards by gravity. This forms a liquid film having a liquid plane sloping downwards from a circumferentially outer side towards a circumferentially inner side. Then, the liquid flows falling down along an inner wall surface of a wall portion 21 from an inner edge of a bottom plate 28a of the liquid reservoir 28, whereby a liquid film (a wet wall) Lf is formed on the inner wall surface of the wall portion 21.

Further, purge gas is preferably supplied to an upper end portion of the liquid film formed by the liquid film forming device 26 and a circumference of the upper end portion. Air or nitrogen can be used as purge gas. Additionally, purge gas is preferably supplied after it is heated to a predetermined temperature (for example, 180° C.).

Figure 9:
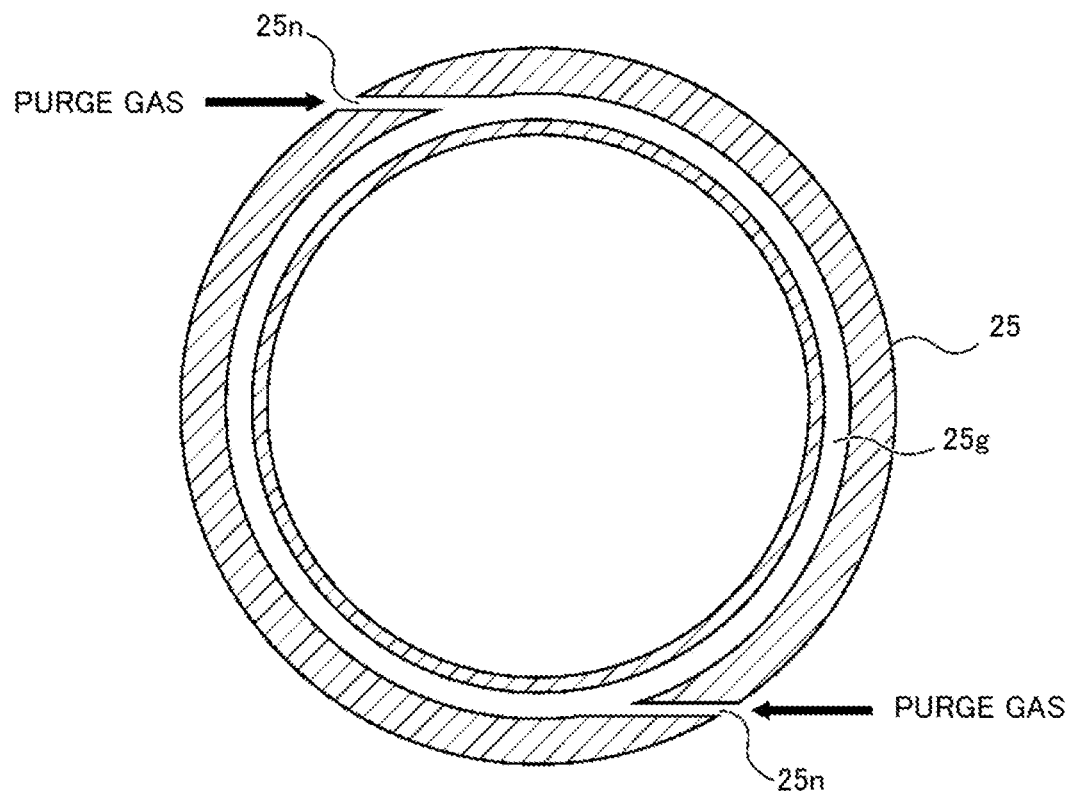
FIG. 9 is a top view of an example of a purge gas supply device for blowing in purge gas as viewed from a top thereof.
Figure 10:
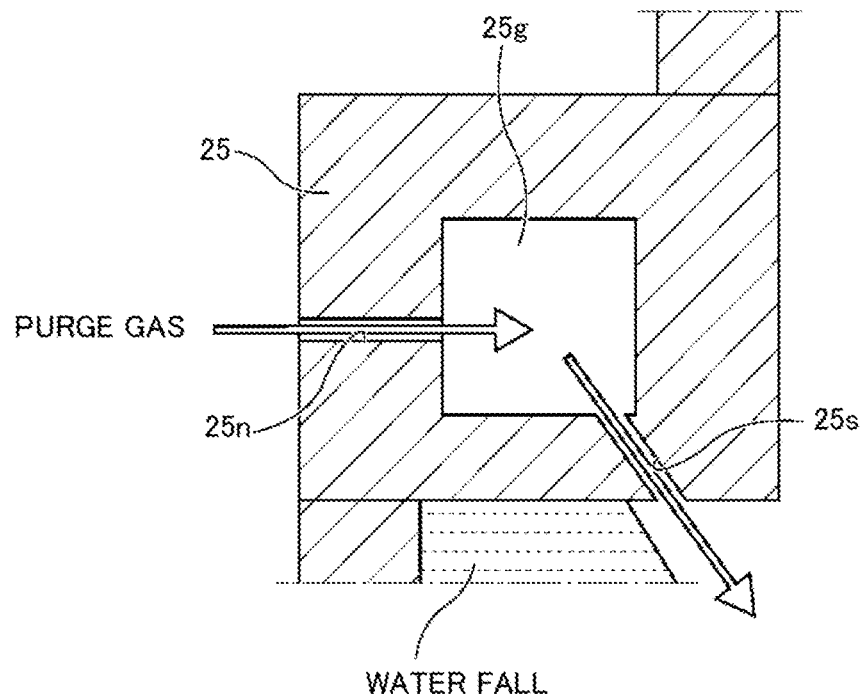
FIG. 10 is a side view of the example of the purge gas supply device for blowing in purge gas as viewed from a side thereof.

FIGS. 9 and 10 illustrate an example of a purge gas supply device 25 configured to blow in purge gas. In the example illustrated in FIGS. 9 and 10, the purge gas supply device 25 has a short circular cylindrical shape and includes a circular groove 25g in an interior thereof. The purge gas supply device 25 is provided on the liquid reservoir 28 and supplies purge gas into the circular groove 25g from a plurality of nozzles 25n provided at intervals in a circumferential direction. Purge gas is blown into the circular groove 25g in a tangent direction to an outer circumferential surface of the circular groove 25g from the nozzles 25n, whereby the purge gas is loaded fully in the circular groove 25g along a full circumference thereof and is then blown out downwards from a full circumference of an opening 25s at a lower end of the circular groove 25g. The opening 25s of the purge gas supply device 25 may slope downwards towards an inner circumferential side as illustrated in FIG. 10, or may be opened simply downwards or towards an inner circumference. By blowing out purge gas into an annular shape from the circular groove 25g in the way described above, the peripheral atmosphere of the upper end portion of the liquid film Lf and its periphery (that is, an upper end portion of a swirling flow of water formed in the liquid reservoir 28 and its vicinity) can be replaced with purge gas (air or nitrogen). In the example illustrated in FIG. 9, while two nozzles 25n are provided, the number of nozzles may be the same as that of liquid supply portions 27 and can be changed as required according to the dimensions of the inlet casing 20.

Figure 11:
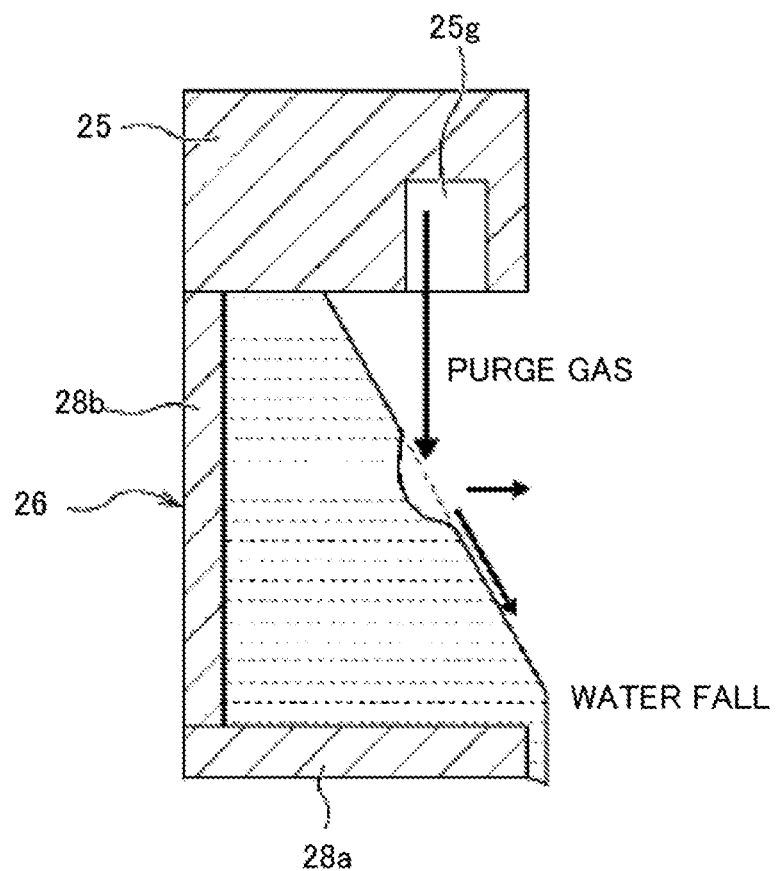
FIG. 11 is a drawing illustrating an example in which the purge gas supply device is used together with the liquid film forming device illustrated in FIGS. 7 and 8.

When providing the purge gas supply device 25, by configuring the liquid film forming device 26 as illustrated in FIGS. 7 and 8, liquid can preferably be restrained from scattering. FIG. 11 illustrates an example where the purge gas supply device 25 is used together with the liquid film forming device 26 illustrated in FIGS. 7 and 8. As described above, the liquid film forming device 26 includes the liquid reservoir 28 having no weir. When purge gas is blown against a liquid film Lf formed by the liquid film forming device 26 configured in that way, part of the liquid film Lf is only dented, and the flow of liquid is not interrupted, whereby the scattering of liquid can preferably be restrained. However, the usage of the purge gas supply device 25 is not limited to the case where the purge gas supply device 25 is used together with the liquid film forming device 26 including the liquid reservoir 28 having no weir, and hence, the purge gas supply device 25 may be used together with the liquid film forming devices 26 having the other configurations illustrated in FIGS. 2 to 6.

Figure 12:
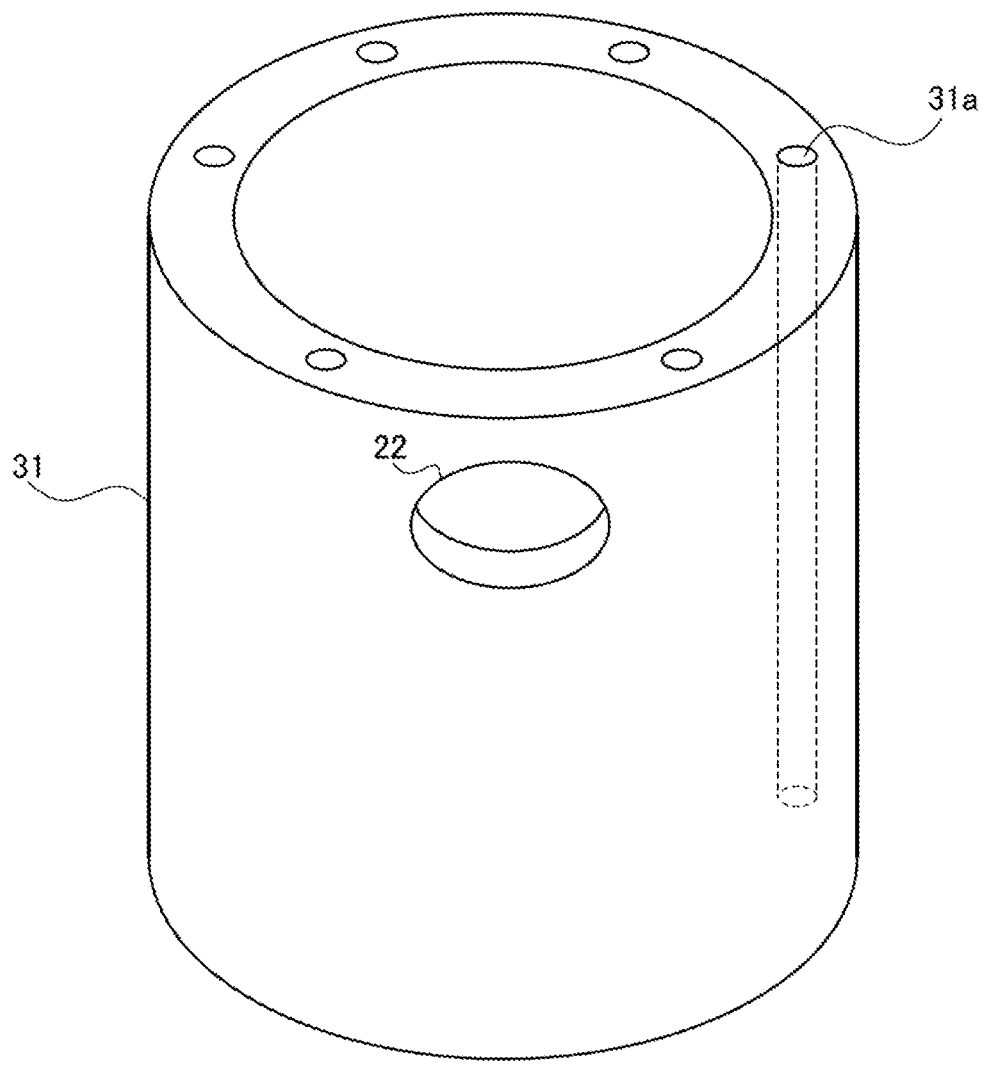
FIG. 12 is an enlarged perspective view of a wall portion of the inlet casing situated above the liquid film forming device.
Figure 13:
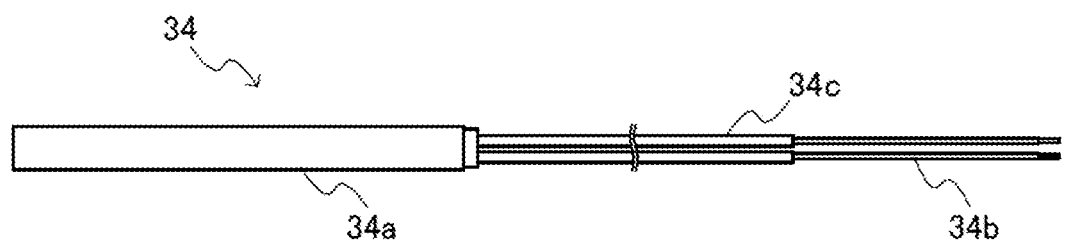
FIG. 13 is a drawing illustrating an example of a cartridge heater.

FIG. 1 is referred to again. A cartridge heater 34 is embedded in the wall portion 31 of the inlet casing 20 which is defined above the liquid film forming device 26 to heat the wall portion 31 to a predetermined temperature (for example, 180° C.). FIG. 12 is an enlarged perspective view of the wall portion 31, and FIG. 13 illustrates an example of a cartridge heater. In FIG. 12, the vicinity of an upper surface portion (refer to FIG. 1) 32 which closes an upper end of the wall portion 31 is omitted from illustration. As illustrated in FIG. 12, the wall portion 31 of the inlet casing 20 is formed so thick as to have a thickness of the order of 10 mm, for example. The wall portion 31 may be formed of the same material as or a different material from that of the wall portion 21, and a stainless steel piping can be made use of for the wall portion 31, for example. Additionally, the wall portion 31 may be thicker than the wall portion 21. Then, a vertical long hole 31a opened upwards is formed in the wall portion 31, and the cartridge heater 34 is inserted in this hole 31a. The cartridge heater 34 is a long heater. The cartridge heater 34 has a heater portion 34a inserted in the hole 31a and a wiring portion 34b connected to an external power supply. The wiring portion 34b is covered by an insulator 34c at a portion lying near the heater portion 34a. A heater having such dimensions as to be embedded in the wall portion 31 should be used as the cartridge heater 34, and hence, a known cartridge heater should be used. The shape of the hole 31a should be designed to match the dimensions of the cartridge heater 34. In the example illustrated in FIG. 12, while six cartridge heaters 34 are provided at certain intervals in a circumferential direction of the wall portion 31, the number of cartridge heaters 34 can be changed as required according to the dimensions and material of the inlet casing 20, as well as the performance of the cartridge heater 34. For example, the number of cartridge heaters 34 may be the same as the number of liquid supply portions 27 on the liquid film forming device 26 or the number of nozzles 25n on the purge gas supply device 25.

To increase an interior surface temperature of the piping, it is general practice to use a jacket heater on an outer side of the piping. In this embodiment, however, the purge gas supply device 25 and the liquid film forming device 26 are located near a lower end of the wall portion 31 on an outer circumferential side thereof, and this makes it difficult to heat directly the wall portion 31 using a jacket heater. Due to this, in the inlet casing 20 of this embodiment, the wall portion 31 is formed so thick that the holes 31a are formed therein, so that the cartridge heaters 34 are inserted in the holes 31a. The wall portion 31 can preferably be heated to the vicinity of the liquid film forming device 26 by embedding the cartridge heaters 34 in the wall portion 31 in the way described above, whereby foreign matters can be prevented from accumulating near the liquid film forming device 26. Additionally, since the wall portion 31 is heated directly by the cartridge heaters 34 embedded in the wall portion 31, the temperature of the wall portion 31 can be increased more efficiently than using a jacket heater, whereby energy can be conserved. Further, a cartridge heater is generally less expensive than a jacket heater, whereby the cost can be reduced. Moreover, in this embodiment, since the cartridge heaters 34 are inserted into the holes 31a formed in the wall portion 31, the cartridge heaters 34 can be detachably mounted in the inlet casing 20, whereby the maintenance and replacement of cartridge heaters 34 can be facilitated.

FIG. 1 is referred to again. In this embodiment, the upper end of the wall portion 31 is closed by the upper surface portion 32. The upper surface portion 32 may be integral with the wall portion 31 or may be fastened to the wall portion 31 with a fastening tool such as a machine screw. Additionally, holes may be formed in the upper surface portion 32 in such a manner as to communicate with the corresponding holes 31a in the wall portion 31 so that the wiring portions 34b of the cartridge heaters 34 are passed therethrough.

As illustrated in FIG. 1, the outlet port 24 of the inlet casing 20 is connected to the liquid tank casing 40. The liquid tank casing 40 has a liquid tank 42, and liquid flowing to form a liquid film Lf, for example, flows down into this liquid tank 42. The liquid tank 42 has a weir 44 located closer to the treatment casing 50 than the outlet port 24 of the inlet casing 20 and a filter 45 located closer to the treatment casing 50 than the weir 44. Hereinafter, in the liquid tank 42, an area located to the left of the weir 44 in FIG. 1 and including a portion directly below the outlet port 24 is referred to as a first liquid tank 42a, an area held between the weir 44 and the filter 45 is referred to as a second liquid tank 42b, and an area located to the right of the filter 45 in FIG. 1 is referred to as a third liquid tank 42c. Liquid flowing downwards from the outlet port 24 of the inlet casing 20 temporarily enters the first liquid tank 42a. Then, the liquid reserved in the first liquid tank 42a flows over the weir 44 to flow into the second liquid tank 42b and then passes through the filter 45 to eventually flow into the third liquid tank 42c. A liquid outlet port 43 is provided in the third liquid tank 42c, so that the liquid within the liquid tank 42 is let out from the liquid outlet port 43. The liquid tank casing 40 also has a communication port 49 in an upper surface thereof, and this communication port 49 communicates with the treatment casing 50. The communication port 49 is preferably provided above the second liquid tank 42b.

In this embodiment, the outlet port 24 of the inlet casing 20 is positioned further downwards (for example, on the order of 10 mm downwards) than an upper end of the weir 44. That is, the outlet port 24 is submerged in liquid reserved in the first liquid tank 42a. Treatment gas let out from the outlet port 24 passes through the first liquid tank 42a to flow through the liquid tank casing 40 and then passes through the communication port 49 to flow into the treatment casing 50. Since the outlet port 24 of the inlet casing 20 is positioned further downwards than the upper end of the weir 44, treatment gas let out from the outlet port 24 is allowed to be brought into contact with liquid reserved in the first liquid tank 42a, thereby making it possible to remove foreign matters and water-soluble constituents contained in the treatment gas.

The liquid tank casing 40 of this embodiment further includes an eductor 48 disposed inside the liquid tank 42. The eductor 48 includes a first eductor 48a provided in the first liquid tank 42a, a second eductor 48b provided in the second liquid tank 42b, and a third eductor 48c provided in the third liquid tank 42c. The first eductor 48a, the second eductor 48b and the third eductor 48c jet liquid downwards. These eductors 48a to 48c should be arranged so that liquid staying near a liquid surface of the liquid tank 42 is let therein. The eductor 48 also includes a fourth eductor (an outlet port eductor) 48d provided in the third liquid tank 42c and configured to jet liquid towards an interior of the liquid tank 42 from the liquid outlet port 43.

Figure 14:
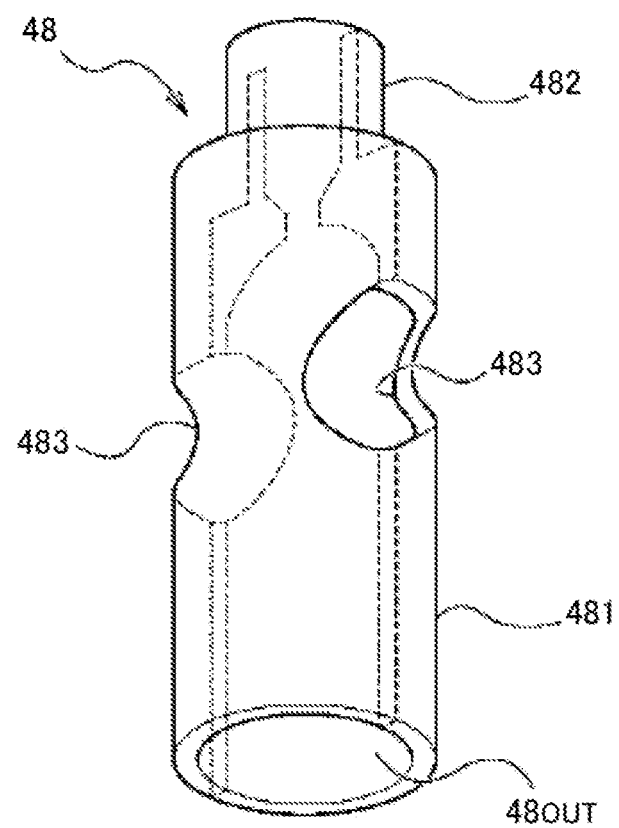
FIG. 14 is a perspective view illustrating the configuration of an eductor of the embodiment.
Figure 15:
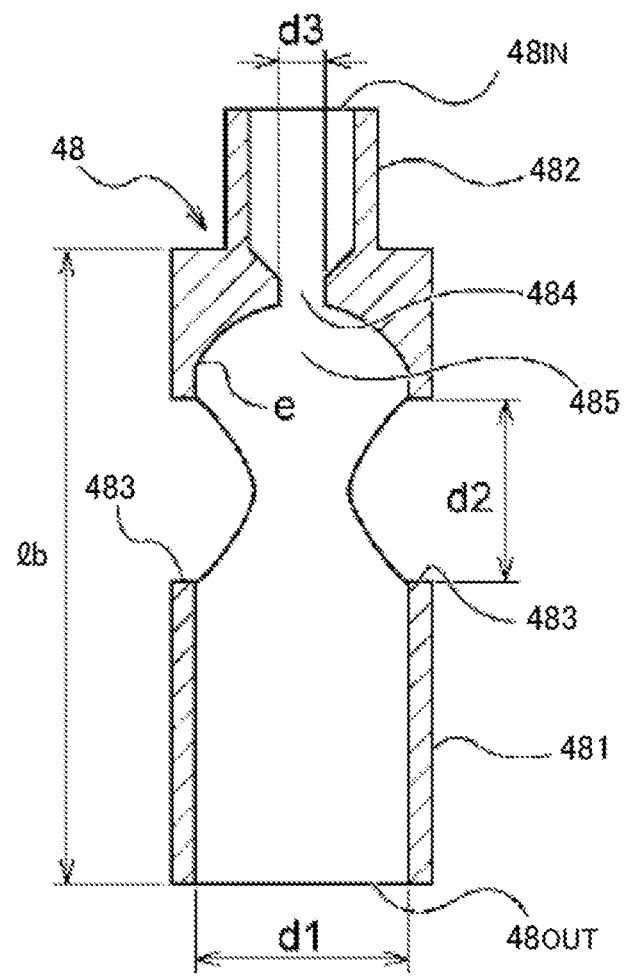
FIG. 15 is a sectional view showing the configuration of the eductor of the embodiment.

In this embodiment, the eductors 48a to 48d (48) are the same eductor. FIGS. 14 and 15 are a perspective view and a sectional view, respectively, which illustrate the configuration of the eductor 48 of this embodiment. The eductor 48 includes a substantially circularly cylindrical main body portion 481 and a water supply portion 482 which is a circularly cylindrical portion of a smaller diameter than the main body portion 481 and into which drive water is supplied. As illustrated in FIG. 15, the main body portion 481 includes a nozzle 484 made up of a small diameter hole configured to jet drive water supplied from the water supply portion 482 at a high speed, a diffusion chamber 485, an opening area of which gradually becomes wider from a lower end of the nozzle 484 towards an end thereof, and two inlet ports 483, 483 formed to face each other in a position located directly below the diffusion chamber 485. In the liquid tank casing 40, the eductors 48a to 48c are disposed vertically in such a manner that an inlet port 48IN formed in the water supply portion 482 is positioned upwards and an outlet port 48OUT formed in a main body portion 3a is positioned downwards. The fourth eductor 48d is disposed in such a manner that the outlet port 48OUT is positioned in a direction in which the outlet port 48OUT lies away from the liquid outlet port 43.

Next, an example of a dimensional relationship among the constituent portions of the eductor 48 will be described. As illustrated in FIG. 15, when an inside diameter of the main body portion 481 is d1 (mm), a bore diameter d3 of the nozzle 484 is set as d3=(0.16 to 0.26) d1, a diameter d2 of the inlet port 483 is set as d2=(0.8 to 0.95) d1, and a length 1b of the main body portion 481 is set as 1b=(2.5 to 3.5) d1. A lower end e of the diffusion chamber 485, the opening area of which gradually becomes wider from the lower end of the nozzle 484 towards the end thereof, is set at the inside diameter d1. Specific dimensions of the constituent portions of the eductor 48 used in this embodiment are as follows: the inside diameter d1 is 19.6 mm; the diameter d2 of the inlet port 483 is 17 mm; the bore diameter d3 of the nozzle 484 is 4.2 mm, an outside diameter of the main body portion 481 is 24 mm; and the length 1b of the main body portion 481 is 59 mm. An overall length of the eductor 48 including the main body portion 481 and the water supply portion 482 is 72 mm, and a resin material such as PVC is used as a material for the eductor 48. As illustrated in the figures, the structure of the eductor 48 is extremely simple, and the eductor 48 is a unit which is small in size, light in weight, and inexpensive in cost.

Figure 16:
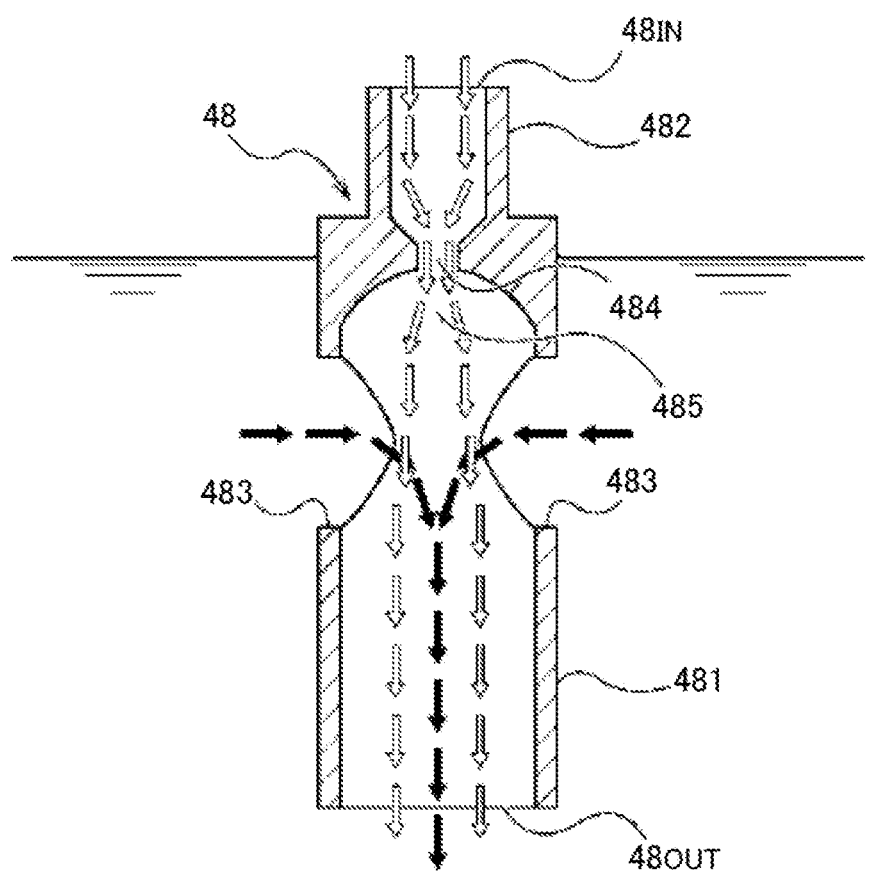
FIG. 16 is a schematic drawing explaining the function of the eductor of the embodiment.

FIG. 16 is a schematic drawing explaining the function of the eductor 48 of this embodiment. Drive water supplied from the inlet port 48IN of the water supply portion 482 is throttled by the nozzle 484 as indicated by white arrows and is jetted into the diffusion chamber 485 at high speeds. As this occurs, the pressure inside the diffusion chamber 485 is reduced by a flow of drive water jetted into the diffusion chamber 485 at high speeds, whereby liquid in the liquid tank 42 is let into the diffusion chamber 485 from the two inlet ports 483, 483 as indicated by black arrows. Water let into the diffusion chamber 485 from the inlet ports 483, 483 is let out from the outlet port 48OUT together with drive water which flows in from the water supply portion 482. In this case, assuming that a quantity of water supplied from the water supply portion 482 is referred to as Q, a quantity of water let in from the two inlet ports 483, 483 is approximately 4Q, and hence, in total, a quantity of liquid corresponding to 5Q is jetted from the eductor 48.

Liquid in the liquid tank 42 can be stirred by the eductor 48 configured in the way described above. This can prevent foreign matters from accumulating at a liquid surface of the liquid tank 42. In addition, depending on situations, constituents contained in treatment gas stay in the liquid tank 42 without being oxidized sufficiently. These insufficiently oxidized constituents can be oxidized completely by stirring the liquid in the liquid tank 42 by the eductor 48, whereby an unintended environment can be restrained from being generated in the liquid tank casing 40. Additionally, the fourth eductor 48d jets liquid in a direction in which the liquid moves away from the liquid outlet port 43. This prevents the liquid outlet port 43 being clogged.

FIG. 1 is referred to again. The liquid tank casing 40 has a nozzle 46 configured to jet liquid against treatment gas flowing inside the liquid tank casing 40. While liquid is preferably dispersed everywhere inside the liquid tank casing 40 by the nozzle 46, the number and arrangement of nozzles 46 should be determined as required based on the dimensions of the liquid tank casing 40. Treatment gas is brought into contact with liquid by jetting liquid against the treatment gas from the nozzle 46, whereby foreign matters and water-soluble constituents contained in the treatment gas can be removed.

The wet abatement system 10 of this embodiment includes a pump 60 configured to send liquid let out from the liquid outlet port 43 of the liquid tank 42 under pressure. A removing mechanism (not shown) for removing foreign matters contained in liquid may be provided on a liquid flow path 61 connected to the pump 60. The pump 60 supplies liquid let out from the liquid outlet port 43 to at least one of the liquid supply portion 27 of the inlet casing 20, the nozzle 46 of the liquid tank casing 40, the water supply portion 482 of the eductor 48, and fan scrubber 56 of the treatment casing 50. Since liquid reserved in the liquid tank 42 is reused, not only can the running cost of the wet abatement system 10 be reduced, but also the wet abatement system 10 can contribute to preservation of the environment. The pump 60 should be able to discharge part of liquid let out from the liquid outlet port 43 to an exterior of the system. The pump 60 should be controlled to keep the level of liquid in the liquid tank 42 (for example, the second liquid tank 42b) within a predetermined range (a range from a predetermined first threshold or higher to lower than a predetermined second threshold) based on a level meter (not shown) provided in the liquid tank 42 (for example, the second liquid tank 42b).

The treatment casing 50 has a flow path 52 extending upwards from the communication port 49 of the liquid tank casing 40 and a treatment chamber 54 accommodating the fan scrubber 56. The treatment chamber 54 has a gas outlet port 57 through which detoxified treatment gas flows and a liquid outlet port 58 from which liquid is let out. The treatment casing 50 has a nozzle 56a configured to supply liquid to the fan scrubber 56 and a nozzle 59 configured to supply liquid to the flow path 52 and the gas outlet port 57. In this embodiment, liquid (recirculation liquid) reserved in the liquid tank 42 is supplied to the nozzle 56a through the pump 60, and fresh water (industrial water or the like) is supplied to the nozzle 59 from a supply portion, not shown. However, the present invention is not limited to these examples, and hence, circulation water may be used for all the various types of liquid used in the wet abatement system 10, or fresh water may be used instead.

The fan scrubber 56 removes foreign matters and water-soluble constituents contained in treatment gas by rotating a fan to stir the treatment gas and liquid. Since a known device can be used for the fan scrubber 56 and the fan scrubber 56 does not constitute the gist of the present invention, a detailed description of the fan scrubber 56 is omitted herein. Treatment gas having passed through the treatment chamber 54 passes through the gas outlet port 57 to be let out to an exterior of the system or to be guided to another abatement system. Liquid inside the treatment chamber 54 passes through the liquid outlet port 58 and is then let out from the treatment chamber 54. In this embodiment, the liquid outlet port 58 is connected to the liquid tank casing 40, and the liquid let out from the treatment chamber 54 flows downwards into the liquid tank 42. Although the liquid outlet port 58 is connected to the liquid tank casing 40 above the third liquid tank 42c in FIG. 1, the liquid outlet port 58 may be connected to the liquid tank casing 40 above the second liquid tank 42b or the first liquid tank 42a.

The embodiment that has been described heretofore can also be described in the following modes.

(First Mode) According to a first mode, there is proposed a wet abatement system for detoxifying treatment gas by bringing the treatment gas into contact with liquid. This wet abatement system includes an inlet casing having an inlet port from which the treatment gas is let in and an outlet port provided below the inlet port and through which the treatment gas flows, a liquid film forming device provided between the inlet port and the outlet port and configured to form a liquid film on an inner wall surface of the inlet casing, and a heater configured to heat the inlet casing and embedded in an interior of a wall portion of the inlet casing, the wall portion constituting a portion situated above the liquid film forming device.

According to the first mode, the liquid film is formed on the inner wall surface of the inlet casing, and the heater is embedded in the interior of the wall portion of the inlet casing which is situated above the liquid film. This allows the inlet casing to be heated to the vicinity of the inner wall surface where the liquid film is formed, thereby making it possible to prevent the accumulation of foreign matters in the treatment gas line.

(Second Mode) According to a second mode, in the wet abatement system of the first mode, a vertical hole is formed in the wall portion of the inlet casing, and the heater is a cartridge heater inserted in the hole.

According to the second mode, the wet abatement system can be configured simple, and the replacement and maintenance of heaters can be facilitated.

(Third Mode) According to a third mode, in the wet abatement system of the first mode or the second mode, the heater is positioned on an inner circumferential side of at least part of the liquid film forming device.

According to the third mode, the vicinity of the liquid film forming device can be heated by the heater, whereby foreign matters can be restrained from accumulating in the inlet casing.

(Fourth Mode) According to a fourth mode, in the wet abatement system of any one of the first to third modes, the liquid film forming device has an annular liquid reservoir lying adjacent to an inner wall surface of the inlet casing.

(Fifth Mode) According to a fifth mode, the wet abatement system of any one of the first to fourth modes further includes a purge gas supply device configured to blow purge gas towards an upper end portion of the liquid film and a circumference of the upper end portion.

According to the fifth mode, accumulation of foreign matters near the liquid film forming device can be suppressed further.

(Sixth Mode) According to a sixth mode, in the wet abatement system of the fifth mode, the heater is positioned on an inner circumferential side of the purge gas supply device.

According to the sixth mode, accumulation of foreign matters near the liquid film forming device can be suppressed further.

(Seventh Mode) According to a seventh mode, the wet abatement system of any one of the first to sixth modes includes a liquid tank casing connected to the outlet port of the inlet casing and having a liquid tank where to reserve liquid supplied by the liquid film forming device, a treatment casing connected to the liquid tank casing, and a fan scrubber provided inside the treatment casing.

According to the seventh mode, foreign matters and water-soluble constituents contained in treatment gas can be removed by the fan scrubber.

(Eighth Mode) According to an eighth mode, in the wet abatement system of the seventh mode, the liquid tank has a weir configured to allow overflowing liquid to flow to a downstream side, and the outlet port of the inlet casing is positioned below an upper end of the weir.

According to the eighth mode, treatment gas flowing out of the outlet port of the inlet casing can be brought into contact with liquid reserved in the liquid tank, thereby making it possible to remove foreign matters and water-soluble constituents contained in the treatment gas.

(Ninth Mode) According to a ninth mode, the wet abatement system of the seventh or eighth mode further includes an eductor provided inside the liquid tank and configured to stir liquid reserved in the liquid tank.

According to the ninth mode, accumulation of foreign matters at a surface of liquid reserved in the liquid tank can be suppressed.

(Tenth Mode) According to a tenth mode, the wet abatement system of any one of the seventh to ninth modes further includes an eductor provided inside the liquid tank and configured to stir liquid reserved in the liquid tank, and the liquid tank has a weir configured to allow overflowing liquid to flow to a downstream side, and a filter provided at the downstream side of the weir, and the eductor has a first eductor provided in a first liquid tank defined further upstream than the weir in the liquid tank, a second eductor provided in a second liquid tank defined between the weir and the filter, and a third eductor provided in a third liquid tank defined further downstream than the filter, the first eductor, the second eductor and the third eductor jetting liquid downwards.

(Eleventh Mode) According to an eleventh mode, in the wet abatement system of any one of the seventh to tenth modes, the liquid tank has a liquid outlet port configured to let liquid reserved in the liquid tank out, and an outlet port eductor configured to jet liquid from the liquid outlet port towards an interior of the liquid tank is provided in the liquid tank.

According to the eleventh mode, the liquid outlet port can be restrained from clogging.

(Twelfth Mode) According to a twelfth mode, the wet abatement system of any one of the seventh to eleventh modes further includes a pump configured to send liquid reserved in the liquid tank to at least one of the liquid film forming device and the fan scrubber.

(Thirteenth Mode) According to a thirteenth mode, the wet abatement system of the twelfth mode further includes a nozzle configured to jet liquid against treatment gas passing through the liquid tank casing, and the pump supplies liquid to the nozzle.

According to the thirteenth mode, the treatment gas passing through the liquid tank casing and the liquid can be brought into contact with each other, thereby making it possible to remove foreign matters and water-soluble constituents contained in the treatment gas.

Thus, while the embodiment of the present invention has been described heretofore, the embodiment of the invention is so described to facilitate the understanding of the present invention and is not intended to limit the present invention. The present invention can be modified and improved without departing from the spirit and scope thereof, and the present invention, of course, includes their equivalents. The embodiment and the resulting modified examples can be combined arbitrarily, and claims and the constituent elements described in the specification can be combined together or omitted, provided that at least part of the problem described above can be solved, or provided that at least part of the advantageous effect can be attained.

This patent application claims the benefit of priority from Japanese Patent Application No. 2018-031823 filed on Feb. 26, 2018. All the disclosure of Japanese Patent Application No. 2018-031823 including the description, claims, drawings and abstract is incorporated entirely herein by reference. All the disclosure of Japanese Patent Laid-Open No. 2003-251130 (PTL 1) including the description, claims, drawings and abstract is incorporated entirely herein by reference.

REFERENCE SIGNS LIST

Wet abatement system: 10
Inlet casing: 20
Wall portion: 21
Inlet port: 22
Outlet port: 24
Liquid film forming device: 26
Liquid reservoir: 28
Wall portion: 31
Hole: 31*a*
Cartridge heater (Heater): 34
Liquid tank casing: 40
Liquid tank: 42
First liquid tank: 42*a*
Second liquid tank: 42*b*
Third liquid tank: 42*c*
Liquid outlet port: 43
Eductor: 48
First eductor: 48*a*
Second eductor: 48*b*
Third eductor: 48*c*
Fourth eductor (Outlet port eductor): 48*d*
Treatment casing: 50
Fan scrubber: 56
Pump: 60

What is claimed is:

1. A wet abatement system for detoxifying treatment gas by bringing the treatment gas into contact with liquid, the wet abatement system comprising:
    an inlet casing having an inlet port from which the treatment gas is let in and an outlet port provided below the inlet port and through which the treatment gas flows;
    a liquid film forming device provided between the inlet port and the outlet port and configured to form a liquid film on an inner wall surface of the inlet casing; and
    a heater configured to heat the inlet casing and embedded in an interior of a wall portion of the inlet casing, the wall portion constituting a portion situated above the liquid film forming device,
    wherein a vertical hole is formed in the wall portion of the inlet casing, and
    wherein the heater is a cartridge heater inserted in the hole.

2. The wet abatement system according to claim 1, wherein the heater is positioned on an inner circumferential side of at least part of the liquid film forming device.

3. The wet abatement system according to claim 1, wherein the liquid film forming device has an annular liquid reservoir lying adjacent to an inner wall surface of the inlet casing.

4. The wet abatement system according to claim 1, further comprising:
    a purge gas supply device configured to blow purge gas towards an upper end portion of the liquid film and a circumference of the upper end portion.

5. The wet abatement system according to claim 4,
    wherein the heater is positioned on an inner circumferential side of the purge gas supply device.

6. The wet abatement system according to claim 1, comprising:
    a liquid tank casing connected to the outlet port of the inlet casing and having a liquid tank where to reserve liquid supplied by the liquid film forming device;
    a treatment casing connected to the liquid tank casing; and
    a fan scrubber provided inside the treatment casing.

7. The wet abatement system according to claim 6,
    wherein the liquid tank comprises a weir configured to allow overflowing liquid to flow to a downstream side, and
    wherein the outlet port of the inlet casing is positioned below an upper end of the weir.

8. The wet abatement system according to claim 6, further comprising:
    an eductor provided inside the liquid tank and configured to stir liquid reserved in the liquid tank.

9. The wet abatement system according to claim 6, further comprising:
    an eductor provided inside the liquid tank and configured to stir liquid reserved in the liquid tank,
    wherein the liquid tank comprises:
    a weir configured to allow overflowing liquid to flow to a downstream side; and
    a filter provided at the downstream side of the weir,
    wherein the eductor comprises:
    a first eductor provided in a first liquid tank defined further upstream than the weir in the liquid tank;
    a second eductor provided in a second liquid tank defined between the weir and the filter; and
    a third eductor provided in a third liquid tank defined further downstream than the filter, and
    wherein the first eductor, the second eductor and the third eductor jet liquid downwards.

10. The wet abatement system according to claim 6,
    wherein the liquid tank comprises:
    a liquid outlet port configured to let liquid reserved in the liquid tank out, and
    wherein an outlet port eductor configured to jet liquid from the liquid outlet port towards an interior of the liquid tank is provided in the liquid tank.

11. The wet abatement system according to claim 6, further comprising:
    a pump configured to send liquid reserved in the liquid tank to at least one of the liquid film forming device and the fan scrubber.

12. The wet abatement system according to claim 11, further comprising:
    a nozzle configured to jet liquid against treatment gas passing through the liquid tank casing,
    wherein the pump supplies liquid to the nozzle.

* * * * *